United States Patent [19]

Scharpf

[11] Patent Number: 4,660,378
[45] Date of Patent: Apr. 28, 1987

[54] EXHAUST SYSTEM WITH SIDE BRANCH

[75] Inventor: Otto H. Scharpf, Brookfield, Wis.

[73] Assignee: Outboard Marine Corporation, Waukegan, Ill.

[21] Appl. No.: 685,238

[22] Filed: Dec. 21, 1984

[51] Int. Cl.[4] ............................................. F02B 27/02
[52] U.S. Cl. ...................................................... 60/313
[58] Field of Search .......................... 60/312, 313, 314

[56] References Cited

U.S. PATENT DOCUMENTS

| | | | |
|---|---|---|---|
| 1,860,569 | 5/1932 | Bourne | 60/314 |
| 3,064,417 | 11/1962 | Tryhorn | 60/312 |
| 3,367,311 | 2/1968 | Tenney | 60/314 |
| 4,522,029 | 6/1985 | Tomita | 60/314 |

FOREIGN PATENT DOCUMENTS

| | | | |
|---|---|---|---|
| 1601350 | 11/1970 | Fed. Rep. of Germany | 60/312 |
| 2534969 | 4/1984 | France | 60/314 |
| 132321 | 9/1980 | Japan | 60/312 |

Primary Examiner—Douglas Hart
Attorney, Agent, or Firm—Michael, Best & Friedrich

[57] ABSTRACT

An engine apparatus comprising an internal combustion engine having a cylinder with an exhaust port, an exhaust gas passageway system communicating with the exhaust port for providing a first compressive wave arriving at the exhaust port prior to closure thereof, and an exhaust gas side branch for providing a second compressive wave arriving at the exhaust port after the first compressive wave and prior to closure of the exhaust port.

13 Claims, 7 Drawing Figures

U.S. Patent   Apr. 28, 1987   Sheet 1 of 2   4,660,378
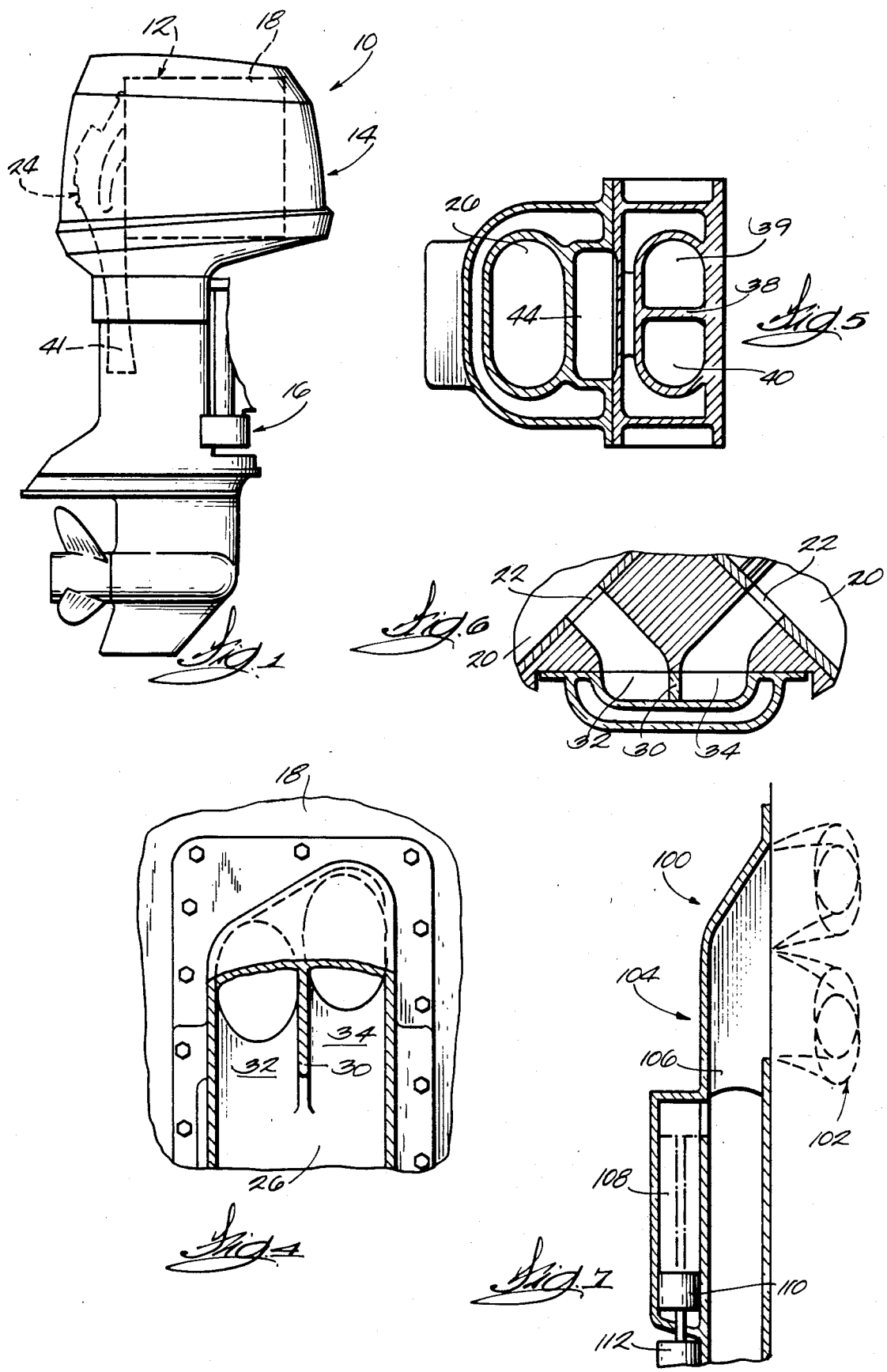

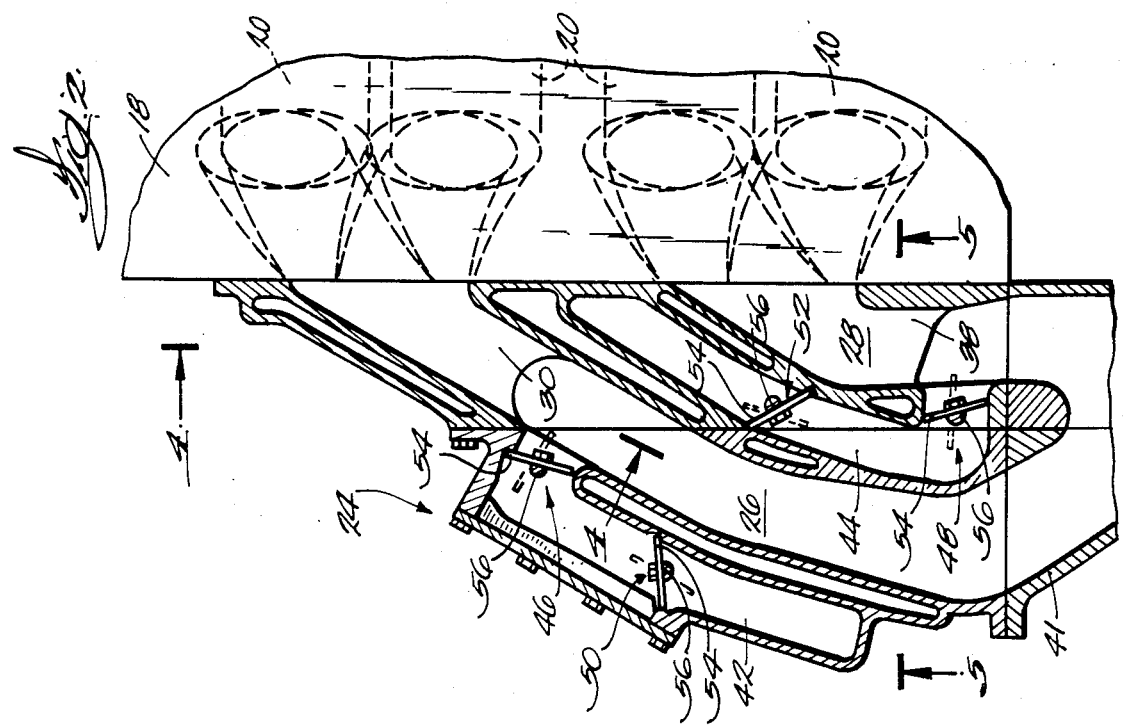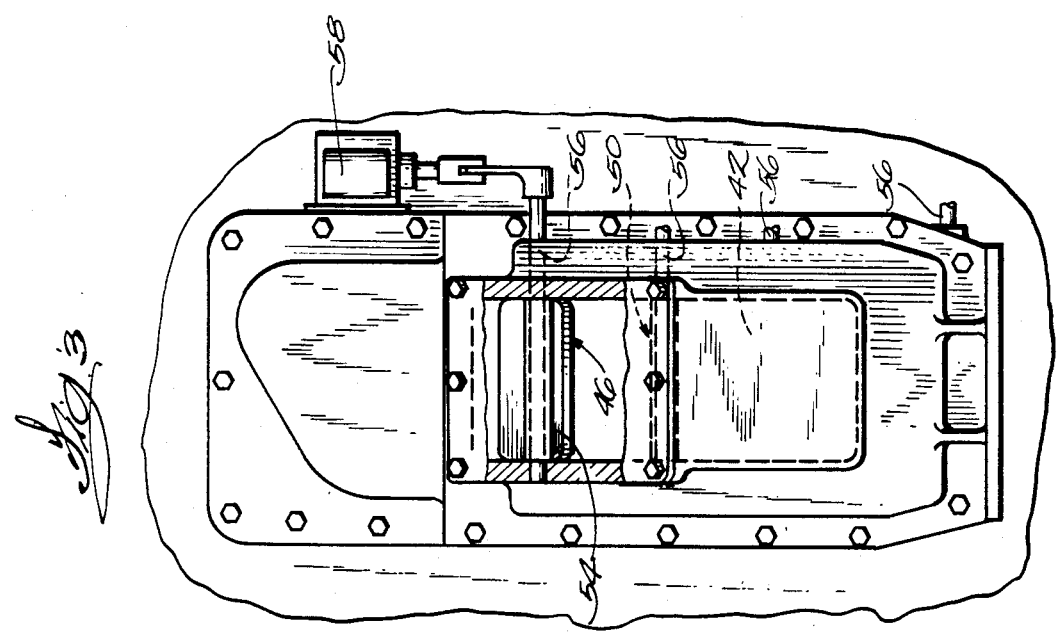

EXHAUST SYSTEM WITH SIDE BRANCH

BACKGROUND OF THE INVENTION

The invention relates to internal combustion engines and, more particularly, to exhaust systems for internal combustion engines.

In general, it is known to utilize returning pressure waves to improve scavenging, thereby to increase the amount of fuel mixture in the next charge and thereby to boost horsepower. It has also been known to apply a compressive pulse from an exhaust gas system to a cylinder just prior to closing of the exhaust port so as to raise the pressure of the fuel mixture in the cylinder and thus effect a "supercharge" and/or to effectively stop the flow of fresh charge from the exhaust port and thus reduce loss of fuel.

Pressure wave travel or acoustical flow, as these terms are employed in this application, takes place at or near the speed of sound and is primarily affected by the static stream temperature of the exhaust gas, i.e., the static temperature of the surrounding environment. Pressure wave travel is essentially independent of the cross sectional area or configuration of the path through which the flow occurs, except for generation of return pulses, either rarefactive or compressive, in response to changes in cross sectional flow area. The mass flow of the exhaust product is dependent, at least in part, on the configuration of the exhaust gas path and upon the pressure differential associated with the path. In exhaust gas flow systems for two stroke engines, the mass flow of the exhaust product is comparatively slow as compared to the acoustical flow and, thus, the acoustical flow is usually not substantially affected by changes in configuration of the exhaust gas path or by pressure differential associated with the path. Accordingly, acoustical flow or pressure wave travel in paths of equal length will generally have the same characteristics, as for instance, the time for flow through one path will be substantially the same as the time for flow through any path of equal length.

U.S. Pat. No. 3,692,006, Miller, et al. issued Sept. 19, 1972, discloses an internal combustion engine having three or more cylinders and exhaust gas discharge means communicating with the exhaust ports of the cylinders for establishing substantially equal acoustical flow distances between each of the exhaust ports and the exhaust port of the subsequently charged cylinder, the acoustical flow distances being such that the compressive wave emanating from the opening of the exhaust port of the immediately previously fired cylinder arrives at the exhaust port of the then being charged cylinder at a time prior to closure of the exhaust port of the cylinder then being charged. In other words, each cylinder is "tuned" by a compressive wave from the immediately previously fired cylinder.

Prior art systems such as the system of U.S. Pat. No. 3,692,006 are generally optimized for high engine speeds and are mistuned at low engine speeds. That is, the acoustical flow distances are such that the compressive wave emanating from the opening of the immediately previously fired cylinder arrives at the exhaust port of the then being charged cylinder a little too early at low engine speeds. This is because at low engine speeds the time interval between the opening of exhaust ports is greater than at high engine speeds. Stated alternatively, the acoustical flow distances are too short for low engine speeds.

Japanese Pat. No. 55-112823 discloses a single cylinder, two stroke engine having an exhaust system wherein a reflected wave or pulse tunes the engine. The exhaust system includes a valve for changing the length of the exhaust passage to maximize both high and low speed performance.

U.S. Pat. No. 1,804,321, Crowe issued May 5, 1931, discloses a variable length vacuum chamber connected to the exhaust passage of an internal combustion engine. The purpose of the Crowe vacuum chamber is to prevent returning exhaust gases from reaching the exhaust port of the engine.

Attention is also directed to the following U.S. patents:

Bourne U.S. Pat. No. 1,860,569, issued May 31, 1932;
Maybach et al. U.S. Pat. No. 2,717,583, issued Sept. 13, 1955;
Kopper U.S. Pat. No. 3,254,484, issued June 7, 1966;
Trisler U.S. Pat. No. 2,862,490, issued Dec. 2, 1958;
Tenney U.S. Pat. No. 3,703,937, issued Nov. 28, 1972;
Raczuk U.S. Pat. No. 3,726,092, issued Apr. 10, 1973; and
Lampheer U.S. Pat. No. 3,808,807, issued May 7, 1974.

SUMMARY OF THE INVENTION

The invention provides an engine apparatus comprising an internal combustion engine having a cylinder with an exhaust port, an exhaust gas passageway system communicating with the exhaust port for providing a first compressive wave arriving at the exhaust port prior to closure thereof, and means for providing a second compressive wave arriving at the exhaust port after the first compressive wave and prior to closure of the exhaust port.

In one embodiment, the means for providing a second compressive wave includes an exhaust gas side branch having a closed end and an opposite entry end selectively communicable with the exhaust gas passageway system.

The invention also provides an engine apparatus comprising an internal combustion engine having a cylinder with an exhaust port, an exhaust gas passageway system communicating with the exhaust port, an exhaust gas side branch having a closed end and an opposite entry end selectively communicable with the exhaust gas passageway system, and means for communicating the entry end of the side branch with the exhaust gas passageway system in response to operation of the engine at speeds below a predetermined speed.

In one embodiment, the means for communicating the entry end of the side branch includes a valve member mounted within the side branch at the entry end, the valve member being selectively and alternatively movable between an open position wherein the valve member opens the entry end of the side branch, and a closed position wherein the valve member closes the entry end of the side branch.

In one embodiment, the valve member is a butterfly valve having a shaft rotatably mounted within the side branch, and the means for communicating the entry end further includes means for rotating the shaft.

The invention also provides an engine apparatus comprising a two-stroke internal combustion engine having a plurality of cylinders each having an exhaust port and being fired in a predetermined sequential order, an exhaust gas passageway system communicating with the exhaust ports and providing substantially equal acoustical flow distances between each of the exhaust ports, an exhaust gas side branch having a closed end and an opposite entry end communicable with the exhaust gas passageway system, and means for closing the entry end of the side branch when the internal combustion engine is operating at speeds above a predetermined speed, and for opening the entry end of the side branch when the engine is operating at speeds below the predetermined speed so that the side branch communicates with the exhaust gas passageway system.

The invention also provides an engine apparatus comprising a two-stroke internal combustion engine having a plurality of cylinders each having an exhaust port and being fired in a predetermined sequential order, an exhaust gas passageway system communicating with the exhaust ports and providing substantially equal acoustical flow distances between each of the exhaust ports, an exhaust gas side branch having a closed end and an opposite entry end communicable with the exhaust gas passageway system, a first valve member mounted within the side branch at the entry end and being selectively and alternatively movable between an open position wherein the first valve member opens the entry end of the side branch, and a closed position wherein the first valve member closes the entry end of the side branch, means for moving the first valve member to the closed position when the internal combustion engine is operating at speeds above a first predetermined speed, and for moving the first valve member to the open position when the engine is operating at speeds below the first predetermined speed, a second valve member mounted within the side branch intermediate the closed end and the entry end and being selectively and alternatively movable between an open position and a closed position, and means for moving the second valve member to the closed position when the engine is operating at speeds between the first predetermined speed and a second predetermined speed below the first predetermined speed, and for moving the second valve member to the open position when the engine is operating at speeds below the second predetermined speed.

The invention also provides an engine apparatus comprising a two-stroke internal combustion engine having a plurality of cylinders each having an exhaust port and being fired in a predetermined sequential order, an exhaust gas passageway system communicating with the exhaust ports and providing substantially equal acoustical flow distances between each of the exhaust ports, an exhaust gas side branch having a closed end and an opposite entry end communicating with the exhaust gas passageway system, a plug slideably received in the side branch for reciprocal movement therein, and means for selectively moving the plug to a position of maximum distance from the entry end of the side branch when the engine is operating at a minimum speed, to positions of successively decreasing distance from the entry end as the engine speed increases from the minimum speed to a predetermined speed, and to a position wherein the plug closes the entry end of the side branch when the engine is operating at speeds above the predetermined speed, such that when the engine is operating at speeds below the predetermined speed the side branch increases the acoustical flow distances by twice the distance from the plug to the entry end of the side branch.

A principal feature of the invention is the provision of an exhaust system including means for providing, at speeds below a predetermined speed, a second compressive wave arriving at the exhaust port after the first compressive wave and prior to closure of the exhaust port.

Another principal feature of the invention is the provision of a side branch or branches. The side branch causes a second pulse to arrive at a time closer to the time of port closing, thereby causing an increase in trapped cylinder pressure. This increases engine power and efficiency.

Another principal feature of the invention is the provision of a side branch having a closed end and an opposite entry end communicable with the exhaust gas passageway system, a first valve member mounted within the side branch at the entry end and selectively and alternatively movable between open and closed positions, and a second valve member mounted within the side branch intermediate the closed end and the entry end and being selectively and alternatively movable between open and closed positions. This allows greater variation of the acoustical flow distances of the exhaust system. At lowest engine speeds, both valve members are open to provide a maximum acoustical flow distance. At higher engine speeds, the first valve member is open and the second valve member is closed to provide a shorter acoustical flow distance. At high engine speeds, the first valve member is closed to provide the shortest acoustical flow distance.

Another principal feature of the invention is the provision of a side branch having a closed end and an opposite entry end communicating with the exhaust system, a plug slideably received in the side branch for reciprocal movement therein, and means for selectively moving the plug to a position of maximum distance from the entry end of the side branch when the engine is operating at a minimum speed, to positions of successively decreasing distance from the entry end as the engine speed increases from the minimum speed to a predetermined speed and to a position wherein the plug closes the entry end of the side branch when the engine is operating at speeds above the predetermined speed. This provides even greater variation of the acoustical flow distance.

Other features and advantages of the invention will become apparent to those skilled in the art upon review of the following detailed description, claims, and drawings.

DESCRIPTION OF THE DRAWINGS

FIG. 1 illustrates an outboard motor including an engine apparatus embodying the invention.

FIG. 2 is a fragmentary cross-sectional view of the engine apparatus.

FIG. 3 is a side view, partially broken away, taken from the left in FIG. 2.

FIG. 4 is a cross-sectional view taken along line 4—4 in FIG. 2.

FIG. 5 is a cross-sectional view taken along line 5—5 in FIG. 2.

FIG. 6 is a top view, partially broken away, of the engine apparatus.

FIG. 7 is a fragmentary cross-sectional view similar to FIG. 2 illustrating an alternative embodiment of the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An outboard motor 10 including an engine apparatus 12 (shown in dotted lines) embodying the invention is shown in FIG. 1. The outboard motor 10 includes a power head 14 and a lower unit 16 which supports the power head 14. The power head 14 includes the engine apparatus 12 which includes a V-8 internal combustion engine 18 (shown schematically in FIG. 1) with first and second cylinder banks (see FIG. 6) located at an angle of 90° with respect to each other. Each bank includes four cylinders 20, and each cylinder 20 includes an exhaust port 22 (see FIG. 6). As is well known in the art, the cylinders 20 are fired in a predetermined sequential order.

It should be understood that while the engine 18 of the preferred embodiment is a V-8 engine, the invention is applicable to any type of internal combustion engine having any number of cylinders.

The engine apparatus also comprises an exhaust gas passageway system 24 communicating between the exhaust ports 22 of the cylinders 20 and the lower unit 16 of the outboard motor 10 for discharging exhaust gases from the lower unit 16, as is well known in the art. The exhaust gas passageway system 24 includes wall means defining an upper exhaust passage 26 communicating with the exhaust ports 22 of the upper four cylinders, and a lower exhaust passage 28 communicating with the exhaust ports 22 of the lower four cylinders. Each of the exhaust passages 26 and 28 is similar to the exhaust gas passage disclosed in Miller U.S. Pat. No. 3,692,006. The upper passage 26 includes a "splitter" 30 (see FIGS. 2, 4 and 6) dividing the upper passage 26 into a first portion 32 communicating with the upper two cylinders of one bank, and a second portion 34 communicating with the upper two cylinders of the other bank. The first and second portions 32 and 34 merge at the downstream end of the splitter 30 into a single passage. The lower exhaust passage 28 includes a splitter 38 (see FIGS. 2 and 5) dividing the lower passage 28 into a first portion 39 communicating with the exhaust ports 22 of the lower two cylinders of one bank, and a second portion 40 communicating with the exhaust ports 22 of the lower two cylinders of the other bank. The first and second portions 39 and 40 of the lower passage 28 merge at the downstream end of the splitter 38 into a single passage. At a point downstream of both of the splitters 30 and 38, the upper and lower exhaust passages 26 and 28 merge into a single exhaust pipe or "megaphone" 41 (see FIG. 1) similar to that disclosed in Miller U.S. Pat. No. 3,692,006.

Among the upper four cylinders, the upper exhaust passage 26 provides substantially equal acoustical flow distances between each of the exhaust ports 22 of the first cylinder bank and each of the exhaust ports 22 of the second cylinder bank. The acoustical flow distances have a length such that at high engine speeds a first compressive wave emanating from the opening of the exhaust port 22 of the immediately previously fired cylinder arrives at the exhaust port 22 of the then being charged cylinder at a time prior to closure of the exhaust port 22 of the cylinder then being charged. Among the lower four cylinders, the lower exhaust passage 28 provides the same substantially equal acoustical flow distances. These acoustical flow distances also have a length such that at high engine speeds a first compressive wave emanating from the opening of the exhaust port 22 of the immediately previously fired cylinder arrives at the exhaust port 22 of the then being charged cylinder at a time prior to closure of the exhaust port 22 of the cylinder then being charged.

The engine apparatus 12 further comprises means for providing, at speeds below a predetermined speed, a second compressive wave arriving at the exhaust port 22 of the then being charged cylinder after the above-mentioned first compressive wave and prior to closure of the exhaust port. In the preferred embodiment, this means includes an upper exhaust gas side branch 42 (see FIG. 2) having a closed end and an opposite entry end selectively communicable with the upper exhaust passage 26, and a lower exhaust gas side branch 44 having a closed end and an opposite entry end selectively communicable with the lower exhaust passage 28. In the preferred embodiment, as best shown in FIG. 2, the entry end of the upper side branch 42 opens into the upper exhaust passage 26 at a point just downstream of the splitter 30, and the entry end of the lower side branch 44 opens into the lower exhaust passage 28 at a point just downstream of the splitter 38.

Looking at one of the exhaust ports 22 communicating with the first portion 32 of the upper exhaust passage 26, for example, a compressive wave emanating from the opening of the exhaust port 22 travels down the first portion 32 of the upper exhaust passage 26 toward the megaphone 41. When the compressive wave reaches the end of the splitter 30, the wave "splits" into three separate waves. One of the waves travels up the second portion 34 of the upper exhaust passage 26 toward the exhaust port 22 of the then being charged cylinder, one of the waves enters the upper exhaust gas side branch 42, and one of the waves continues out of the exhaust gas passageway system 24 through the megaphone 41. At low engine speeds, the first compressive wave traveling up the second portion 34 of the upper exhaust passage 26 arrives at the exhaust port 22 of the then being charged cylinder a little too early, as described above. The second wave entering the side branch 42 is reflected by the closed end of the side branch 42 and reenters the upper exhaust passage 26. Upon reentering the upper exhaust passage 26, the second wave "splits" into three waves. One of the waves travels out the megaphone 41, one of the waves travels up the first portion 32 of the upper exhaust passage 26, and one of the waves travels up the second portion 34 of the upper exhaust passage 26. The wave traveling up the second portion 34 of the exhaust passage 26 becomes a second compressive wave arriving at the exhaust port 22 of the then being charged cylinder after the above-mentioned first compressive wave and prior to closure of the exhaust port 22. This second compressive wave arrives at a time closer to closure of the exhaust port 22, thereby causing an increase in trapped cylinder pressure. This increases engine power and efficiency. The lower exhaust gas side branch 44 functions in the same way.

Thus, upper side branch 42 has a length which, when the upper side branch 42 is in communication with the upper exhaust passage 26, increases the acoustical flow distances between the upper four cylinders so that at speeds below the predetermined speed, or at low engine speeds, a second compressive wave arrives at the exhaust port 22 of the then being charged cylinder at a time prior to closure of the exhaust port 22 of the cylinder then being charged. The lower side branch 44 has a length which, when the lower side branch 44 is in communication with the lower exhaust passage 28, increases the acoustical flow distances between the lower four cylinders so as to have the same effect as the upper side branch 42.

The apparatus 12 further comprises means for communicating the entry end of the upper side branch 42 with the upper exhaust passage 26 in response to operation of the engine 18 at speeds below a predetermined speed, and means for communicating the entry end of the lower side branch 44 with the lower exhaust passage 28 in response to operation of the engine 18 at speeds below the predetermined speed.

Various suitable means can be employed for communicating the entry end of the upper side branch 42 with the upper exhaust passage 26, and for communicating the entry end of the lower side branch 44 with the lower exhaust passage 28. In the preferred embodiment, the means for communicating the entry end of the upper side branch 42 with the upper exhaust passage 26 includes means for closing the entry end of the upper side branch 42 when the engine 18 is operating at speeds above the predetermined speed (at high engine speeds), and for opening the entry end of the upper side branch 42 when the engine 18 is operating at speeds below the predetermined speed (at low engine speeds) so that the upper side branch 42 communicates with the upper exhaust passage 26. The means for communicating the entry end of the lower side branch 44 with the lower exhaust passage 28 includes means for closing the entry end of the lower side branch 44 when the engine 18 is operating at speeds above the predetermined speed, and for opening the entry end of the lower side branch 44 when the engine 18 is operating at speeds below the predetermined speed so that the lower side branch 44 communicates with the lower exhaust passage 28.

In the preferred embodiment, the means for opening and closing the entry end of the upper side branch 42 includes a valve member 46 (see FIG. 2) mounted within the upper side branch 42 adjacent the entry end. The valve member 46 is selectively and alternatively movable between an open position wherein the valve member 46 opens the entry end of the upper side branch 42, and a closed position wherein the valve member 46 closes the entry end of the upper side branch 42. The means for opening and closing the entry end of the upper side branch 42 also includes means for moving the valve member 46 to the closed position when the engine 18 is operating at speeds above a first predetermined speed, and for moving the valve member 46 to the open position when the engine 18 is operating at speeds below the first predetermined speed.

In the preferred embodiment, the means for opening and closing the entry end of the lower side branch 44 includes a valve member 48 (see FIG. 2) mounted within the lower side branch 44 adjacent the entry end. The valve member 48 is selectively and alternatively movable between an open position wherein the valve member 48 opens the entry end of the lower side branch 44, and a closed position wherein the valve member 48 closes the entry end of the lower side branch 44. The means for opening and closing the entry end of the lower side branch 44 also includes means for moving the valve member 48 to the closed position when the engine 18 is operating at speeds above a first predetermined speed, and for moving the valve member 48 to the open position when the engine 18 is operating at speeds below the first predetermined speed.

The engine apparatus 12 preferably further comprises a valve member 50 (see FIG. 2) mounted within the upper side branch 42 intermediate the closed end and the entry end and being selectively and alternatively movable between an open position wherein the valve member 50 opens the portion of the upper side branch 42 between the valve member 50 and the closed end, and a closed position wherein the valve member 50 closes the portion of the upper side branch 42 between the valve member 50 and the closed end. The apparatus 12 preferably further comprises means for moving the valve member 50 to the closed position when the engine 18 is operating at speeds between the first predetermined speed and a second predetermined speed below the first predetermined speed, and for moving the valve member 50 to the open position when the engine 18 is operating at speeds below the second predetermined speed.

The engine apparatus 12 preferably further comprises a valve member 52 (see FIG. 2) mounted within the lower side branch 44 intermediate the closed end and the entry end and being selectively and alternatively movable between an open position wherein the valve member 52 opens the portion of the lower side branch 44 between the valve member 52 and the closed end, and a closed position wherein the valve member 52 closes the portion of the lower side branch 44 between the valve member 52 and the closed end. The apparatus 12 preferably further comprises means for moving the valve member 52 to the closed position when the engine 18 is operating at speeds between the first predetermined speed and the second predetermined speed, and for moving the valve member 52 to the open position when the engine 18 is operating at speeds below the second predetermined speed.

While various suitable valve members 46, 48, 50 and 52 can be employed, in the preferred embodiment, each of the valve members is a butterfly valve 54 having a shaft 56 (see FIG. 3) rotatably mounted within the side branch, and the means for moving the valve member includes means for rotating the shaft 56. In the illustrated construction, as best shown in FIG. 3, the means for rotating the shaft 56 includes a solenoid 58 (only one is shown) having an extendible and retractable arm pivotally connected to a lever extending from the end of the shaft 56. Extension and retraction of the solenoid arm causes rotation of the shaft 56, thereby moving the butterfly valve 54 between the open and closed positions. In the preferred embodiment, the solenoid 58 is controlled by a conventional engine speed sensor (not shown) operably connected to the engine 18 for sensing engine speed.

Illustrated in FIG. 7 is an alternative embodiment of the invention. Shown in FIG. 7 is an engine apparatus 100 comprising a V-4 internal combustion engine 102 (the cylinders are represented by dotted lines) similar to the engine disclosed in Miller U.S. Pat. No. 3,692,006. The apparatus 100 also comprises an exhaust gas passageway system 104 similar to the upper exhaust passage 26 of the preferred embodiment. The exhaust gas passageway system 104 communicates with the exhaust ports of the cylinders. The exhaust gas passageway system 104 includes a splitter 106 and, like the exhaust passages of the preferred embodiment, provides substantially equal acoustical flow distances between each of the exhaust ports. The acoustical flow distances are such that when the engine is operating at speeds above a predetermined speed (at high engine speeds) the compressive wave emanating from the opening of the exhaust port of the immediately previously fired cylinder arrives at the exhaust port of the then being charged cylinder at a time prior to closure of the exhaust port of the cylinder then being charged.

The apparatus 100 further comprises an exhaust gas side branch 108 similar to the side branches of the preferred embodiment and having a closed end and an opposite entry end communicating with the exhaust gas passageway system 104. Preferably, as in the preferred embodiment, the side branch 108 communicates with the exhaust gas passageway system 104 just downstream of the splitter 106. In this alternative embodiment, the apparatus 100 further comprises a plug 110 slideably received in the side branch 108 for reciprocal movement therein, and means for selectively moving the plug 110 to a position of maximum distance from the entry end of the side branch 108 when the engine 102 is operating a minimum speed, to positions of successively decreasing distance from the entry end of the side branch 108 as the engine speed increases from the minimum speed to the predetermined speed (over the range of low engine speeds), and to a position wherein the plug 110 closes the entry end of the side branch 108 when the engine 102 is operating at speeds above the predetermined speed (at high engine speeds). Thus, when the engine 102 is operating at speeds below the predetermined speed, or at low engine speeds, the side branch 108 increases the acoustical flow distances by twice the distance from the plug 110 to the entry end of the side branch 108 such that a second compressive wave arrives at the exhaust port of the then being charged cylinder at a time prior to closure of the exhaust port of the cylinder then being charged.

In the illustrated construction, the means for moving the plug 110 includes conventional hydraulic means 112.

This arrangement of the alternative embodiment offers even greater variation of the acoustical flow distances in response to variation of the engine speed.

It should be understood that this alternative embodiment of the invention is also applicable to any type of internal combustion engine having any number of cylinders.

Various of the features and advantages of the invention are set forth in the following claims.

I claim:

1. An engine apparatus comprising an internal combustion engine including first and second cylinders with respective first and second exhaust ports, and an exhaust gas passageway means communicating with said exhaust ports for providing first compressive waves arriving at said exhaust ports prior to closure thereof, and second compressive waves arriving at said exhaust ports after said first compressive waves, said exhaust gas passageway means including first and second passageways communicating respectively with said first and second ports and with each other at a common distance from said first and second ports, and an exhaust gas side branch having a permanently closed end and an opposite entry end communicating with said exhaust gas passageways at a distance from said first and second ports at least as great as said common distance.

2. An engine apparatus comprising an internal combustion engine including first and second cylinders with respective first and second exhaust ports, exhaust gas passageway means communicating with said exhaust ports for providing first compressive waves arriving at said exhaust ports prior to closure thereof and second compressive waves arriving at said exhaust ports after said first compressive waves, said exhaust gas passageway means including first and second passageways communicating respectively with said first and second ports and with each other at a common distance from said first and second ports, an exhaust gas side branch having a closed end and an opposite entry end communicating with said exhaust gas passageways at a distance from said first and second ports at least as great as said common distance, and means for selectively closing the communication between said side branch entry end and said exhaust gas passageways.

3. An engine apparatus comprising a two-stroke internal combustion engine having first and second cylinders having respective first and second ports and being fired in a predetermined sequential order, an exhaust gas passageway system including first and second passageways communicating respectively with said first and second ports and with each other at a common distance from said first and second ports, an exhaust gas side branch having a closed end and an opposite entry end communicable with said exhaust gas passageways at a distance from said first and second ports greater than said common distance, and means for closing said entry end of said side branch when said internal combustion engine is operating at speeds above a predetermined speed, and for opening said entry end of said side branch when said engine is operating at speeds below said predetermined speed so that said side branch communicates with said exhaust gas passageway system.

4. An engine apparatus as set forth in claim 3 wherein said means for closing and opening said entry end of said side branch includes a valve member mounted within said side branch adjacent said entry end and selectively and alternatively movable between an open position wherein said valve member opens said entry end of said side branch, and a closed position wherein said valve member closes said entry end of said side branch.

5. An engine apparatus as set forth in claim 4 wherein said valve member is a butterfly valve having a shaft rotatably mounted within said side branch, and wherein said means for closing and opening said entry end further includes means for rotating said shaft.

6. An engine apparatus comprising a two-stroke internal combustion engine having a plurality of cylinders each having an exhaust port and being fired in a predetermined sequential order, an exhaust gas passageway system communicating with said exhaust ports, said exhaust gas passageway system providing substantially equal acoustical flow distances between each of said exhaust ports, an exhaust gas side branch having a closed end and an opposite entry end communicable with said exhaust gas passageway system, a first valve member mounted within said side branch adjacent said entry end and being selectively and alternatively movable between an open position wherein said first valve member opens said entry end of said side branch, and a closed position wherein said first valve member closes said entry end of said side branch, means for moving said first valve member to said closed position when said internal combustion engine is operating at speeds above a first predetermined speed, and for moving said first valve member to said open position when said engine is operating at speeds below said first predetermined speed, a second valve member mounted within said side branch intermediate said closed end and said entry end and being selectively and alternatively movable between an open position and a closed position, and means for moving said second valve member to said closed position when said engine is operating at speeds between said first predetermined speed and a second predetermined speed below said first predetermined speed, and for moving said second valve member to said open position when said engine is operating at speeds below said second predetermined speed.

7. An engine apparatus as set forth in claim 6 wherein said first valve member is a butterfly valve having a shaft rotatably mounted within said side branch, and wherein said means for moving said first valve member includes means for rotating said shaft.

8. An engine apparatus as set forth in claim 7 wherein said second valve member is a second butterfly valve having a shaft rotatably mounted within said side branch, and wherein said means for moving said second valve member includes means for rotating said second butterfly valve shaft.

9. An engine apparatus comprising a two-stroke internal combustion engine having first and second cylinders having respective first and second exhaust ports and being fired in a predetermined sequential order, an exhaust gas passageway system including first and second passageways communicating respectively with said first and second ports and with each other at a common distance from said first and second ports, an exhaust gas side branch having a closed end and an opposite entry end communicating with said exhaust gas passageways at a distance from said first and second ports at least as great as said common distance, a plug slideably received in said side branch for reciprocal movement therein, and means for selectively moving said plug to a position of maximum distance from said entry end of said side breach when said engine is operating at a minimum speed, to positions of successively decreasing distance from said entry end as the engine speed increases from said minimum speed to a predetermined speeds, and to a position wherein said plug closes said entry end of said side branch when said engine is operating at speeds above said predetermined speed, such that when said engine is operating at speeds below said predetermined speed said side branch increases said acoustical flow distances by twice the distance from said plug to said entry end of said side branch.

10. An engine apparatus comprising a two-stroke internal combustion engine including first and second cylinders having respective first and second ports and being fired in a predetermined sequential order, an exhaust gas passageway system including first and second passageways communicating respectively with said first and second ports and with each other at a common distance from said first and second ports, an exhaust gas side branch having a closed end and an opposite entry end communicable with said exhaust gas passageways at a distance from said first and second ports greater than said common distance, and means for selectively closing and opening said entry end of said side branch to enable selective communication of said side branch with said exhaust gas passageways.

11. An engine apparatus as set forth in claim 10 wherein said means for closing and opening said entry end of said side branch includes a valve member mounted within said side branch adjacent said entry end and selectively and alternatively movable between an open position wherein said valve member opens said entry end of said side branch, and a closed position wherein said valve member closes said entry end of said side branch.

12. An engine apparatus as set forth in claim 10 wherein said valve member is a butterfly valve having a shaft rotatably mounted within said side branch, and wherein said means for closing and opening said entry end further includes means for rotating said shaft.

13. An engine apparatus comprising a two-stroke internal combustion engine having first and second cylinders having respective first and second exhaust ports and being fired in a predetermined sequential order, an exhaust gas passageway system including first and second passageways communicating respectively with said first and second ports and with each other at a common distance from said first and second ports, an exhaust gas side branch having a closed end and an opposite entry end communicating with said exhaust gas passageways at a distance from said first and second ports at least as great as said common distance, a plug slideably received in said side branch for reciprocal movement therein, and means for selectively moving said plug within said side branch.

* * * * *